R. S. MORSE.
FRUIT DRIER.
No. 12,167.
Patented Jan. 2, 1855.
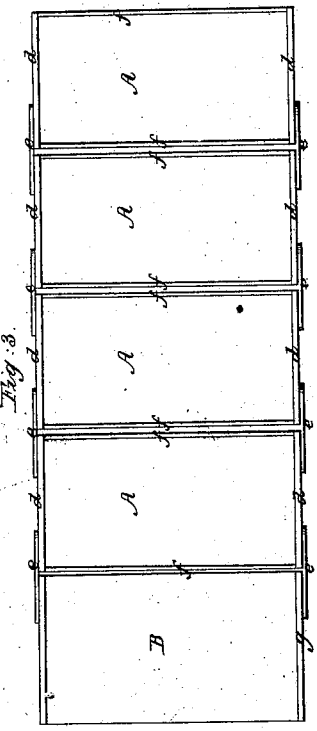
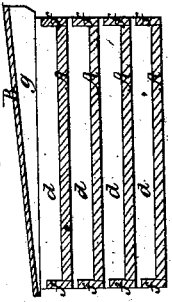
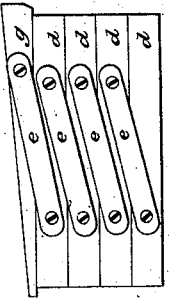

UNITED STATES PATENT OFFICE.

RUSSELL S. MORSE, OF EAST DIXFIELD, MAINE.

FRUIT-DRIER.

Specification of Letters Patent No. 12,167, dated January 2, 1855.

*To all whom it may concern:*

Be it known that I, RUSSELL S. MORSE, of East Dixfield, in the county of Oxford and State of Maine, have invented a new and Improved Fruit-Drier; and I do hereby declare that the following is a full and exact description thereof, reference being had to the accompanying drawings, making a part of this specification, Figure 1, being a side view; Fig. 2, a section and Fig. 3, a top view of my improved drier, in an extended position for drying; and Fig. 4, a section and Fig. 5, a side view of said drier in a closed position for resisting moisture.

Similar letters indicate like parts in all the figures.

I construct my improved fruit drier of a series of trays A, $d, d, f, f$, and a roof B, $g, g$, connected to each other by the side hinging bars, $e, e$, substantially as represented in the drawings. The ends $d, d$, of the trays rise a little above the sides thereof, so that when the drier is folded up into the position shown in Figs. 4, and 5, the respective trays will rest upon their ends, and leave narrow openings between the sides of each tray and the bottom of the next tray above it, for the free circulation of air into and through the trays. The top B, of the roof, is made broader than the trays, for the purpose of causing protecting projections beyond the sides of the trays. The ends $g, g$, of the roof B, are inclined a sufficient degree to give the roof a proper inclination.

When the drier is spread out in the open air, for use, the prepared fruit is placed in thin layers upon the trays; and before the dew commences to fall in the evening, and previous to a shower, the drier is folded up for protection against injury to the fruit by moisture; and may be carried under a roof when there is an appearance of a heavy shower or a continuous rain storm. The roof B, will protect the trays from injury, when a sudden shower comes on until the driers can be all placed beneath an ample protecting roof.

In consequence of the roof B, being wider than the trays, the hinging bars $e, e$, which connect it to the end tray of the series, must be of greater length than those which connect the trays to each other, as shown in Fig. 5.

What I claim as my invention and desire to secure by Letters Patent, is—

Constructing a portable fruit drier of a series of trays and a protecting roof, united to each other by hinging bars, substantially as herein set forth.

The above specification of my new and useful improvement in fruit driers, signed and witnessed this 12th day of October, 1854.

RUSSELL S. MORSE.

Witnesses:
   Z. C. ROBBINS,
   GEO. A. C. SMITH.